Oct. 2, 1962  G. C. SUMMERS  3,056,463
SONIC BORE HOLE LOGGING DEVICES
Filed Feb. 9, 1959
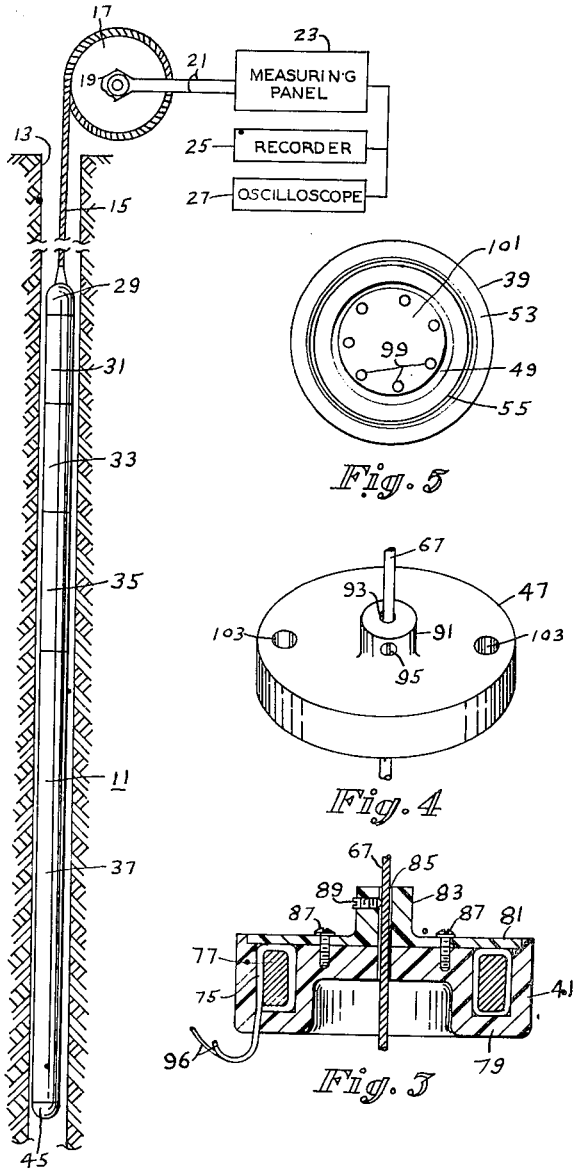
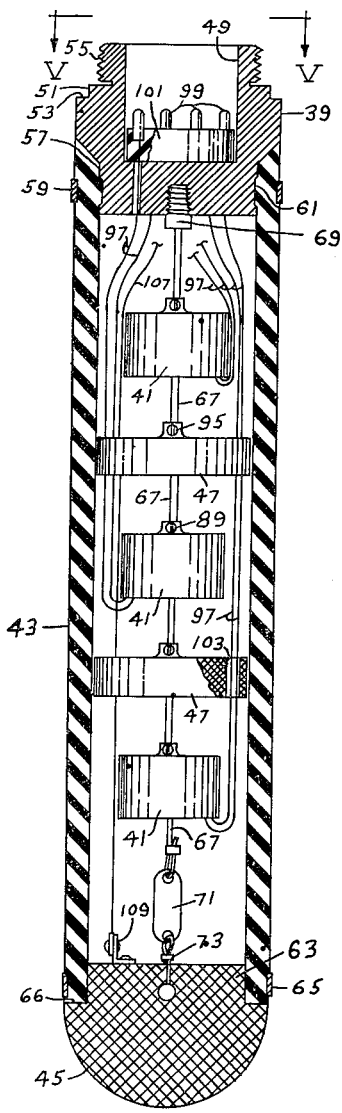
INVENTOR.
GERALD C. SUMMERS
BY *Wm. T. Wofford*
ATTORNEY

United States Patent Office 3,056,463
Patented Oct. 2, 1962

3,056,463
SONIC BORE HOLE LOGGING DEVICES
Gerald C. Summers, Dallas, Tex., assignor, by mesne assignments, to PGAC Development Company, Houston, Tex., a corporation of Texas
Filed Feb. 9, 1959, Ser. No. 791,989
12 Claims. (Cl. 181—.5)

My invention relates to sonic bore hole logging devices, and more particularly to apparatus for use in sonic or acoustic logging systems of a type designed to determine certain characteristics of earth formations in a bore hole for petroleum exploration and production purposes.

One object of my invention is to reduce the initial cost of instruments used in the logging or surveying of bore holes and particularly those portions of the instrument assembly in the bore hole which are most likely to be left in the hole if the assembly becomes stuck and cannot be retrieved in its entirety.

Another object of my invention is to provide instrument assembly components which when not easily retrievable can be simply drilled out of the way, thus avoiding costly "fishing" operations.

Another object of my invention is to provide a logging instrument assembly wherein certain measuring elements which must be electrically or mechanically isolated from other components of the assembly are arranged in a string beneath the instrument assembly main body.

Another object of my invention is to provide a logging instrument assembly wherein the measuring elements are located at the bottom portion of the assembly so as to be as near as possible to the bottom of the bore hole, which is often a zone of primary interest.

These and other objects are effected by my invention as will be apparent from the following description taken in accordance with the accompanying drawing, forming a part of this application, in which:

FIG. 1 is a schematic diagrammatic view showing a typical logging system wherein my invention may be utilized with the logging instrument being shown within a bore hole extending through a section of the earth;

FIG. 2 is a schematic section view showing the lower section of a combination acoustic and electrical logging instrument in accordance with a preferred embodiment of my invention;

FIG. 3 is a section view showing details of one of the acoustic transducer elements of FIG. 2;

FIG. 4 is a schematic perspective view of one of the lead weight elements of FIG. 2; and FIG. 5 is plan view as indicated at line V—V of FIG. 2.

Referring now to the drawings, there is shown in FIG. 1 a logging instrument assembly 11 lowered into a bore hole 13 by means of a cable 15 which is reeled off a conventional cable drum 17 which is powered and controlled by conventional means (not shown). The cable 15 in addition to supporting the instrument assembly 11, has a conductor core (not shown) insulated from an outer sheath, thus constituting a two conductor line. The cable drum shaft is provided with a pair of slip rings with associated brushes 19, through which electric signals are transmitted from the cable via a pair of suitable conductors 21 to the conventional above-ground equipment indicated in block form by way of example, as a measuring panel 23, a recorder 25, and an oscilloscope 27.

The sections of the down-hole instrument assembly as shown by FIG. 1 include, by way of illustration, reading from top to bottom, a cable head section 29, a receiver amplifier section 31, a transmitter section 33, a transmitting transducer section 35, and a receiver section 37. The components of the down-hole instrument assembly, except the receiver section 37, may all be of conventional types, each component being built into a heavy pipe section having threaded coupling devices at its ends, as well as suitable electrical connector devices. The cable 15 is fixed at its lower end to the cable head section 29 which is coupled at its lower end to the receiver amplifier section 31.

The receiver section 37 of the instrument assembly 11, which is shown by FIG. 2, comprises an upper support coupler 39, a plurality of acoustic transducers 41, a case 43, a lead nose electrode 45, and lead weights 47. The support coupler 39 is a steel cylinder having a centrally disposed cylindrical cavity 49 opening at its upper end for receiving electrical connections. The upper exterior of the coupler has a first portion 51 of reduced diameter forming a shoulder 53 for receiving a sealing ring (not shown) and a second portion of reduced diameter having external threads 55 adapted for threading into the lower end of the transmitting transducer section 35 which is immediately above the receiver section 37. The lower exterior portion 57 of the support coupler has a reduced diameter and is adapted for receiving the upper end of the case 43. The case is in the form of a heavy rubber, or rubber reinforced with fabric, hose. The rubber is preferably of an oil resistant type such as neoprene. The case inside diameter is made such as to fit onto the cylindrical surface of the support coupler lower portion 57. The case is clamped onto the support coupler by a steel clamping band 59, which forces some of the case material into a peripheral groove 61 formed in the support coupler lower portion 57. The external diameter of the case 43 is made substantially the same as or slightly smaller than that of the coupler 39 and upper instrument sections. The lead nose electrode 45 is a solid body of lead having an upper cylindrical portion 63 of reduced diameter providing a shoulder 66 and having the portion below the shoulder rounded. The diameter of the nose cylindrical portion 63 is made such as to fit the internal diameter of the case 43 which is received by it and clamped onto it by means of an exterior clamping band 65. The lead nose electrode is also utilized for electrical resistivity, or self-potential logging.

A support cable 67 is fixed at its upper end to a plug 69 which is threaded into the lower face of the support coupler 39, and at its other end to one end of a strain insulator 71 which is secured by an anchor 73 at its other end to the upper face of the lead nose electrode 45. The plug 69 and anchor 73 are positioned so that the support cable 67 is coaxial with the case longitudinal axis. Suspended on and supported by the cable 67 are a plurality of the acoustic transducer receiver elements 41 and lead weights 47.

As is shown in FIG. 3, each acoustic transducer receiver element 41 comprises a toroidal winding 75 on a magnetostrictive core 77 in the form of a hollow spool, scroll, or ring. The core material is preferably a material such as that known in the art as Vanadium Permendur, comprising approximately 50% iron, 48% cobalt, and 2% vanadium. The core 77 and its winding 75 are contained in a suitable carrier or housing comprising a housing body 79 and a housing top closure 81, both made of insulating material such as a lightweight plastic. The exterior peripheral surface of the housing as shown is cylindrical, with the diameter being substantially less than the inner diameter of the case 43. The closure 81 is a circular cap having a central hub 83 integral with and extending upwardly from the closure top face. The hub 83 and the housing body 79 are provided with a central axial bore 85 for receiving the support cable 67. The closure 81 is secured to the housing body 79 by means of screws 87. In assembly the cable 67 is passed through the bore 85 of the transducer housing and the transducer is fixed to the cable 67 at the chosen location by means of a set screw 89 in the housing closure hub 83. The transducers 41 and their carrier or housing, per se form no part of the present invention, and it is to be understood that the housing may take any suitable form which will not impede transmission of acoustic wave energy to the transducer 41.

Each lead weight 47 is in the form of a cylindrical disc having a central hub 91, with an axial bore 93 in the disc and hub for receiving the cable 67. The cable is received in the bore 93 and the weight 47 is fixed to the cable 67 at the chosen location by means of a set screw 95 in the hub 91. The diameter of each weight 47 is substantially the same as the case 43 inside diameter.

In the receiver section shown by FIG. 2, there are three transducers 41 and two lead weights 47, with the weights being disposed between adjacent pairs of transducers. Each transducer has a pair of output leads 96 which are connected by means of suitable leads 97 to respective pins 99 of a male connector element 101 which is fixed within the cavity 49 of the support coupler 39 and which is adapted for receiving a female connector element (not shown) in the lower end of the instrument assembly section immediately above. The receiver element leads 97 are passed through suitable openings 103 in the weights. One pin 99 of the male connector 101 is connected via a suitable lead 107 to a terminal 109 which is fixed onto the lead nose electrode 45. The case 43 is filled with an electrically non-conductive fluid, such as oil, to prevent it being compressed with resulting damage to the transducers 41. The case 43 serves as an acoustic window and the oil transmits sound from its inner wall to the transducers. The case 43 also serves as an electrical insulator for the nose electrode 45.

Since no expensive or massive parts are supported by the cable 67, it can be small. A large cable would itself transmit sound energy at a velocity of the order of 12,000 feet per second. In acoustic velocity logging of formations of less than cable acoustic velocity, the first arrival would come from the cable, making accurate measurement of formation velocity complicated or impossible. With the apparatus disclosed herein, the cable size required to support the necessary weight is far less than a size which would introduce acoustic transmission problems. In a typical case, the maximum tension force which the receiver transducer section cable 67 would withstand is about 800 pounds, whereas the instrument assembly suspension cable 15 would take up to 20,000 pounds of tension force, and the force required to pull the cable head 29 off the instrument assembly would be about 6,000 pounds.

In many types of well logging, particularly acoustic, it is necessary that the detector, or transducer devices be isolated mechanically from each other. In electrical well logging it is necessary that the measuring elements be isolated from electrically conductive supporting members. A principal advantage of the arrangement of my invention is that the detector, transducer, or measuring elements are placed in a string beneath the main body of the instrument assembly, eliminating heavy metal support members, so that if the lower part of the instrument assembly becomes stuck in the bore hole, then the instrument assembly main body can be removed, leaving only the relatively inexpensive detector, or transducer assembly in the hole. Another important advantage of my invention is that the detector or transducer assembly is made up almost entirely of materials such as lead, rubber, and plastic, which can be readily ground up or drilled out of the way thus avoiding costly "fishing" operations. It should be pointed out that support coupler 39 will remain with the main instrument assembly in cases where the transducer-detector section is left in a bore hole.

The number and type of detector-transducer elements used may vary from that specifically disclosed herein without departing from the spirit of my invention. Also, the number, shape, and disposition of the lead weights 47 may vary. In some cases the lead nose cone alone would provide sufficient weight to prevent the lower section of the instrument assembly from floating and keep the cable 67 always in tension.

The foregoing disclosure and the showings made in the drawings are merely illustrative of the principles of this invention, and are not to be interpreted in a limiting sense. While I have shown my invention in only one form, it will be obvious to those skilled in the art that it is not so limited, but is susceptible of various changes and modifications without departing from the spirit thereof.

I claim:

1. A down hole instrument assembly for use in an acoustic bore hole logging system, comprising a receiver transducer detector section and a plurality of additional sections including a transmitter transducer section for transmitting acoustic signals of predetermined frequency and also including an amplifier section, with said additional sections being respectively housed in metallic cylinders mechanically coupled together to form a unitary cylindrical body extending longitudinally of the bore hole and having an upper end and a bottom end, said detector section including a fluid-tight housing filled with an electrically non-conductive fluid and having a side wall in the form of a cylinder extending longitudinally of the bore hole and formed of an electrical insulating, circumferentially expandable material capable of transmitting acoustic wave energy, an upper closure for said detector section in the form of a metallic support coupler secured to the upper end of said side wall, a lower end closure for said side wall, a first cable secured at one end to said coupler and at the other end to said lower end closure, said cable extending coaxially of said housing, an acoustic transducer suspended within said housing on said first cable, means coupling said support coupler to the bottom end of said cylindrical body, and means for attaching the upper end of said cylindrical body to a second cable for suspending said down hole instrument assembly in a bore hole, said first cable being sufficiently small so as not to be an effective transmitter of acoustic wave energy at the frequency of the acoustic signals transmitted by said transmitter transducer section and being also sufficiently small as to part at an applied tension of substantially less force than that required to break said second cable and also substantially less than that required to part said second cable from said attaching means, said side wall being detachable from said upper end closure by application of a tension through said second cable of less force than that required to break said second cable and also less than that required to part said second cable from said attaching means.

2. The apparatus defined by claim 1 wherein a plurality of acoustic receiving transducers are suspended at spaced apart intervals upon said first cable within said housing.

3. The apparatus defined by claim 1 wherein a plurality of acoustic receiving transducers are suspended at spaced apart intervals upon said first cable within said housing and wherein a plurality of weights are also suspended at spaced apart intervals upon said first cable within said housing.

4. The apparatus defined by claim 1 wherein the side wall, the lower end closure, and the acoustic receiving transducer are formed of readily drillable materials.

5. The apparatus defined by claim 3 wherein the side wall, the lower end closure, the acoustic receiving transducers and the weights are formed of readily drillable materials.

6. The apparatus defined by claim 1 wherein said lower end closure is in the form of a metallic nose piece forming an electrical well logging electrode.

7. A down hole instrument assembly for use in an acoustic bore hole logging system, comprising a first transducer section and a plurality of additional sections, with said additional sections being housed in a rigid cylindrical body extending longitudinally of the bore hole and having an upper end and a bottom end, said transducer section including a housing having a side wall in the form of a cylinder extending longitudinally of the bore hole and formed of an electrical insulating, circumferentially expandable material capable of transmitting acoustic wave energy, an upper closure for said transducer section in the form of a metallic support coupler secured to the upper end of said side wall, a lower end closure for said side wall, a first cable extending coaxially of said housing and secured at one end to said coupler and at the other end to said lower end closure, an acoustic transducer suspended within said housing on and connected directly to said first cable, means coupling said support coupler to the bottom end of said cylindrical body, and means for attaching the upper end of said cylindrical body to a second cable for suspending said down hole instrument assembly in a bore hole, said first cable being sufficiently small so as not to be an effective transmitter of acoustic wave energy at the frequency of the acoustic signals and being also sufficiently small as to part at an applied tension of substantially less force than that required to break said second cable and also substantially less than that required to part said second cable from said attaching means, said side wall being detachable from said upper end closure by application of a tension force through said second cable of less force than that required to break said second cable and also less than that required to part said second cable from said attaching means.

8. The apparatus defined by claim 7 wherein the side wall, the lower end closure, and the transducer are formed of readily drillable materials.

9. The apparatus defined by claim 7 wherein said lower end closure is in the form of a metallic nose piece forming an electrical well logging electrode.

10. A down hole instrument assembly for use in an acoustic bore hole logging system, comprising a first transducer detector section and a plurality of additional sections including a second transducer section and an amplifier section, with said additional sections being respectively housed in metallic cylinders mechanically coupled together to form a unitary cylindrical body extending longitudinally of the bore hole and having an upper end and a bottom end, said first transducer section including a fluid-tight housing having a side wall in the form of a cylinder extending longitudinally of the bore hole and formed of an electrical insulating, circumferentially expandable material capable of transmitting acoustic wave energy, an upper closure for said first transducer section in the form of a metallic support coupler secured to the upper end of said side wall, a lower end closure for said side wall, a first cable extending coaxially of said housing and secured at one end to said coupler and at the other end to said lower end closure, an acoustic transducer suspended within said housing on and connected directly to said first cable, means coupling said support coupler to the bottom end of said cylindrical body, and means for attaching the upper end of said cylindrical body to a second cable for suspending said down hole instrument assembly in a bore hole, said first cable being sufficiently small so as not to be an effective transmitter of acoustic wave energy at the frequency of the acoustic signals and being also sufficiently small as to part at an applied tension of substantially less force than that required to break said second cable and also substantially less than that required to part said second cable from said attaching means, said side wall being detachable from said upper end closure by application of a tension force through said second cable of less force than that required to break said second cable and also less than that required to part said second cable from said attaching means.

11. The apparatus defined by claim 10 wherein the side wall, the lower end closure, and the transducer are formed of readily drillable materials.

12. The apparatus defined by claim 10 wherein said lower end closure is in the form of a metallic nose piece forming an electrical well logging electrode.

References Cited in the file of this patent

UNITED STATES PATENTS

| | | |
|---|---|---|
| 2,233,992 | Wyckoff | Mar. 4, 1941 |
| 2,249,108 | Beers | July 15, 1941 |
| 2,589,599 | Bond et al. | Mar. 18, 1952 |
| 2,651,027 | Vogel | Sept. 1, 1953 |
| 2,708,485 | Vogel | May 17, 1955 |
| 2,713,147 | Stripling | July 12, 1955 |
| 2,742,629 | Summers et al. | Apr. 17, 1956 |
| 2,757,358 | Ely | July 31, 1956 |
| 2,794,512 | Martin | June 4, 1957 |
| 2,868,311 | Tullos | Jan. 13, 1959 |
| 2,938,592 | Charske et al. | May 31, 1960 |